United States Patent
Park

[11] Patent Number: 6,115,529
[45] Date of Patent: Sep. 5, 2000

[54] SUB-PICTURE RESTORING METHOD AND APPARATUS IN DIGITAL VIDEO DISK SYSTEM

[75] Inventor: Pan-Gie Park, Ansan, Rep. of Korea

[73] Assignee: Samsung Electronics Co., Ltd., Kyungki-Do, Rep. of Korea

[21] Appl. No.: 08/883,704

[22] Filed: Jun. 27, 1997

[30] Foreign Application Priority Data

Jun. 29, 1996 [KR] Rep. of Korea ............... 96-26258

[51] Int. Cl.[7] ............................................. H04N 5/76
[52] U.S. Cl. ........................... 386/1; 386/45; 386/125
[58] Field of Search ................................ 386/45.1, 125, 386/126; 345/150, 199, 509; 382/162, 166, 167

[56] References Cited

U.S. PATENT DOCUMENTS

| | | | |
|---|---|---|---|
| 5,721,720 | 2/1998 | Kikuchi et al. | 386/45 |
| 5,758,007 | 5/1998 | Kitamura et al. | 386/45 |
| 5,781,183 | 8/1999 | Takahashi et al. | 345/199 |
| 5,940,067 | 8/1999 | Greene | 345/199 |
| 5,949,409 | 9/1999 | Tanaka et al. | 345/199 |

*Primary Examiner*—Thai Tran
*Attorney, Agent, or Firm*—Sughrue, Mion, Zinn, Macpeak & Seas, PLLC

[57] ABSTRACT

A sub-picture restoring method and apparatus defined in the specification of a commercialized digital video disk (DVD) system is provided. A bit stream buffer (33) stores the sub-picture data and a color lookup table of the compression-encoded bit stream. A run-length decoder (35) decodes the pixel data in the sub-picture data and outputs two bit data representing a pixel type (e.g., background pixel, character pixel, edge emphasis pixel, etc.). An index generator (36) outputs the color index and contrast value of the corresponding pixel according to the pixel type. A color controller (37) outputs a color of a table position designated by the color index input from the loaded color lookup table. A controller (34) loads the color lookup table stored in the bit stream buffer, analyzes various commands in the display control sequence table of the sub-picture data in order to control the decoding execution, stop and output for the run-length decoder in a match for a display area, and outputs the color index and contrast information with respect to each pixel to the index generator.

18 Claims, 6 Drawing Sheets

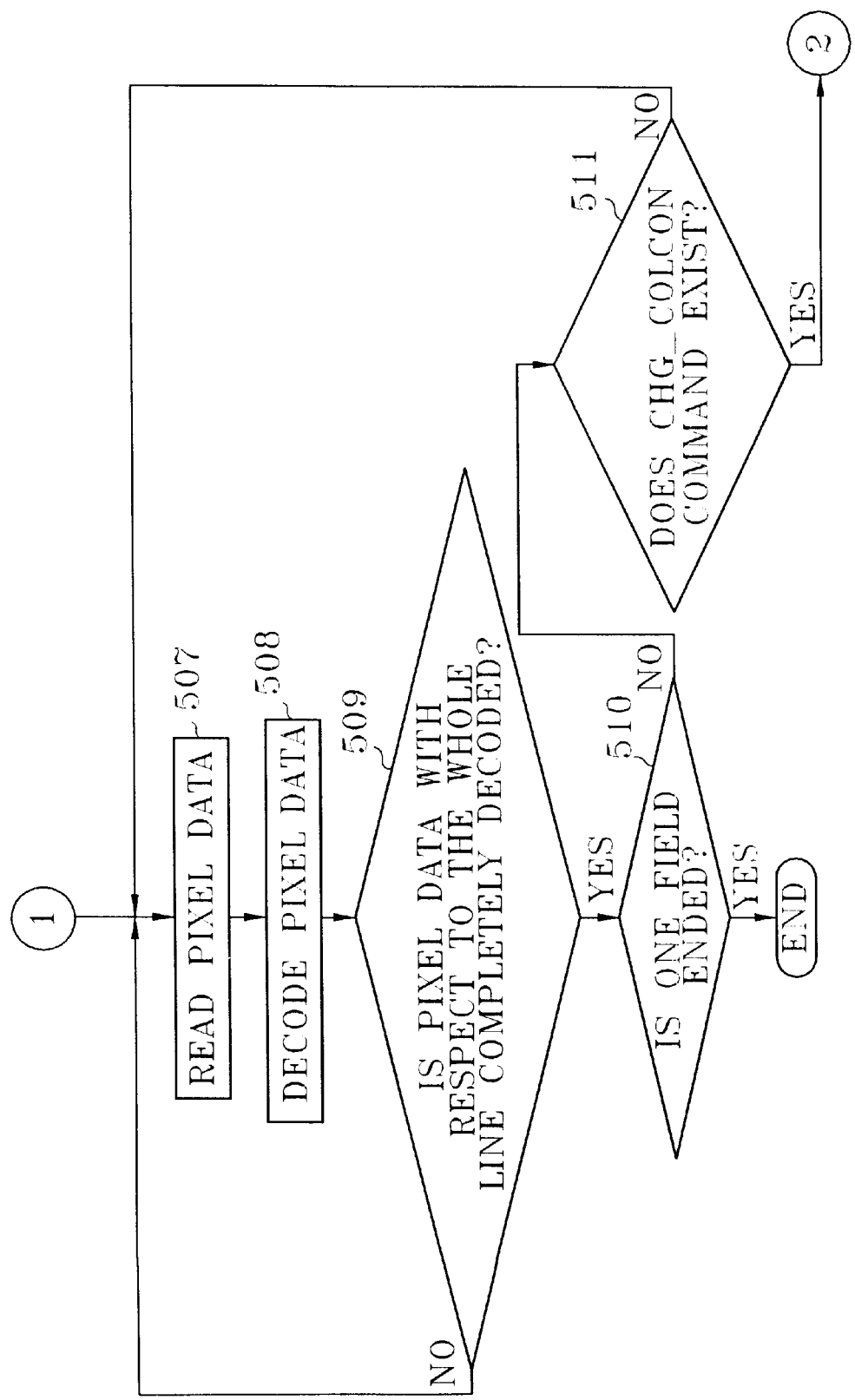

SUB-PICTURE RESTORING METHOD AND APPARATUS IN DIGITAL VIDEO DISK SYSTEM

BACKGROUND OF THE INVENTION

The present invention relates to a digital video disk (DVD) system. More particularly, it relates to a sub-picture restoring method and apparatus in a DVD system which restores characters or graphics defined in the DVD standard and displays the restored result. This application for a DVD sub-picture restoring method and apparatus is based on Korean Patent Application No. 96-26258 which is incorporated by reference herein for all purposes.

A DVD has been developed, which can provide higher picture quality than that of a compact disk (CD). The DVD is convenient to use and handle, as is the CD, and can be used as a reproduction-only medium for movie to computer media. Also, various proposals have been made in conjunction with the DVD standard, one of which is use of sub-picture data. The sub-picture data is graphic data which can be displayed in the form of a caption on a screen, in which a basic unit is defined in the form of FIG. 1.

FIG. 1 shows the structure of sub-picture data defined in the DVD standard. The sub-picture data includes a header having general information with respect to a sub-picture, pixel data which is produced by compressing the actual sub-picture, and a display control sequence table (DCSQT). The DCSQT includes display control sequences (DCSQ0, DCSQ1, . . . ) of a frame unit having display control commands in conjunction with sub-pictures and time information in conjunction with execution of these commands, in the form of a table.

Here, the pixel data includes 2-bit data for discriminating the four types of patterns. Therefore, each pixel becomes a background pixel around a character when the 2-bit data is "00," a character pattern pixel when the former is "01," a first emphasis pixel of the edge of the character when the former is "10," and a second emphasis pixel when the former is "11." The above pixel data is encoded by compression based upon the number of sequential repetitions of the same pattern type of the pixels via a run-length coding operation.

The DCSQT contains information about the size and position of horizontal and vertical display areas on a screen necessary for decoding sub-picture data of the compression-encoded bit stream. In more detail, the DCSQ of the frame unit constituting the DCSQT contains information about display time of the sub-picture, compulsory display having no relation with the display time, sub-picture display end time, color designation with respect to each pixel, and a pixel contrast value for determining a mixture ratio with respect to the particular other image data. The DCSQ also contains the display area information of the sub-picture data, the position information with respect to the compressed pixel data, and the information which can alter color and contrast with respect to the pixel belonging to a particular range.

The information which can alter color and contrast with respect to the pixel belonging to a particular range will be described below with reference to FIG. 2. FIG. 2 shows the pattern of a command CHG_COLCON for altering the color and contrast of the sub-picture pixel. The contents of the command are largely divided between a line control information LCINF with respect to a particular range of a line unit and a pixel control information PCINF with respect to a particular range of a pixel unit. A maximum of eight kinds of pixel control information PCINF can exist with respect to a single line control information LCINF, while various kinds of line control information LCINF can exist with respect to a single command CHG_COLCON. The LCINF contains the start line number, the end line number and the number of the pixel control information PCINF existing in the range with respect to the range in which the color and contrast are identically altered. The PCINF contains the start pixel number representing the horizontal start position existing in the range with respect to the range in which the color and contrast are identically altered, and the color and contrast values which are altered with respect to each pixel until the start pixel number of the next pixel control information is input.

SUMMARY OF THE INVENTION

It is an object of the present invention to provide a method for restoring a sub-picture defined in a DVD standard.

It is another object of the present invention to provide an apparatus for embodying a DVD sub-picture restoring method.

To accomplish the above object of the present invention, there is provided a sub-picture restoring method in a digital video disk (DVD) system, the sub-picture restoring method comprising the steps of: (a) storing input sub-picture data and color lookup table; (b) analyzing a display control sequence table contained in the sub-picture data of step (a); (c) decoding the pixel data in the sub-picture data stored in step (a) based on the analysis result of step (b); (d) determining a contrast value corresponding to an individual pixel which is expressed by the pixel data decoded in step (c) based on the analysis result of step (b); and (e) determining a color value for a corresponding pixel of step (d) in the color lookup table of step (a) using a color index obtained by the analysis result of step (b).

There is also provided a sub-picture restoring apparatus in a digital video disk (DVD) system, the sub-picture restoring apparatus having a storage means for storing input sub-picture data and color lookup table, and a control means for analyzing a display control sequence table contained in the sub-picture data stored in the storage means and obtaining a sub-picture display area on a screen, and color index information and contrast information for displaying a pixel in the sub-picture display area. The apparatus also has a decoding means for decoding the pixel data in the sub-picture data stored in the storage means, as well as a determining means for determining a contrast value corresponding to an individual pixel which is expressed by the pixel data decoded in the decoding means using the contrast information obtained by the control means and determining a color value for a corresponding pixel in the color lookup table stored in the storage means using a color index information obtained by the control means.

BRIEF DESCRIPTION OF THE DRAWINGS

The preferred embodiments are described with reference to the drawings wherein:

FIGS. 5A and 5B are a flow-chart diagram for explaining the operation with respect to every field of the FIG. 3 apparatus.

DETAILED DESCRIPTION OF THE PREFERRED EMBODIMENT

A preferred embodiment of the present invention will be described in detail with reference to the accompanying drawings.

Figure 3:
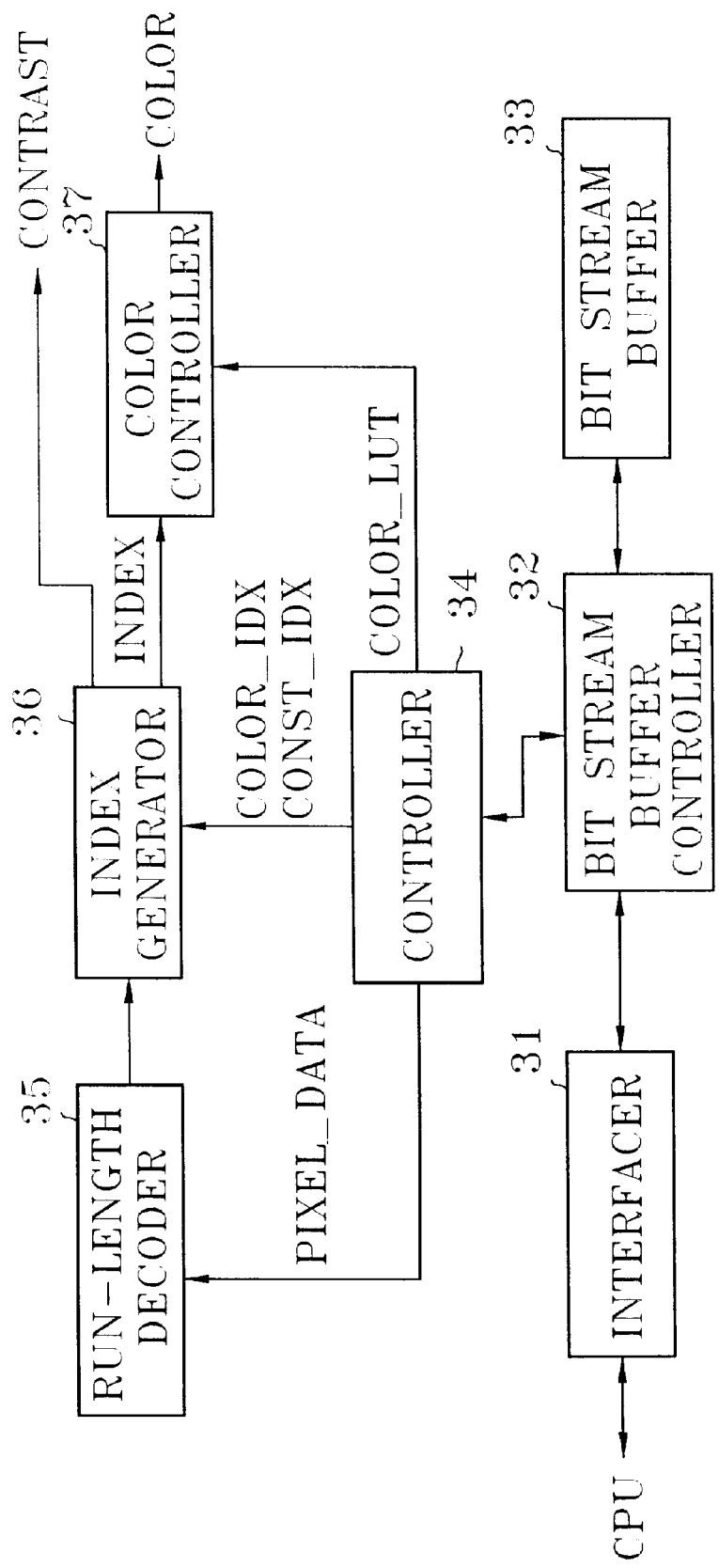
FIG. 3 is a block diagram showing a sub-picture restoring apparatus in the DVD system according to the present invention.

A sub-picture restoring apparatus of FIG. 3 according to the present invention, includes an interfacer 31 for interfacing with a central processing unit (CPU) (not shown) which is a host controller for the DVD system. A bit stream buffer 33 stores the sub-picture data and pixel colors which are received in the bit stream form via the interfacer 31, in a lookup table form. A bit stream buffer controller 32, disposed between the interfacer 31 and the bit stream buffer 33, controls the bit stream buffer 33. The sub-picture restoring apparatus also includes a controller 34 for controlling operation of each of the respective elements, and which reads the color lookup table and the sub-picture data stored in the bit stream buffer 33 via the bit stream controller 32. A run-length decoder 35 receives the pixel data contained in the sub-picture data read in the controller 34 and decodes the received data. An index generator 36 receives color index information Color_Idx and contrast information Const_Idx of the display control sequence table contained in the sub-picture data read into the controller 34 and outputs the color index and the contrast value for expressing the data decoded in the run-length decoder 35. The sub-picture restoring apparatus also includes a color controller 37 which receives the color lookup table read in the controller 34 and outputs the color value corresponding to the color index output from the index generator 36.

In FIG. 3, the bit stream buffer controller 32 requests the sub-picture data to the CPU via the interfacer 31 in response to a data request of the bit stream buffer 33. Accordingly, the CPU transfers the compression-encoded bit stream sub-picture data to the restoring apparatus via the interfacer 31. The bit stream controller 32 stores the bit stream sub-picture data input via the interfacer 31 in the bit stream buffer 33. Also, the CPU provides a color palette, together with the sub-picture date, which is to be used with respect to the pixel data of the sub-picture data in the lookup table form. The bit stream buffer 33 stores the color lookup table together with the sub-picture data. The controller 34 performs an operation at the start of every frame, which will be described with reference to FIG. 4.

Figure 4:
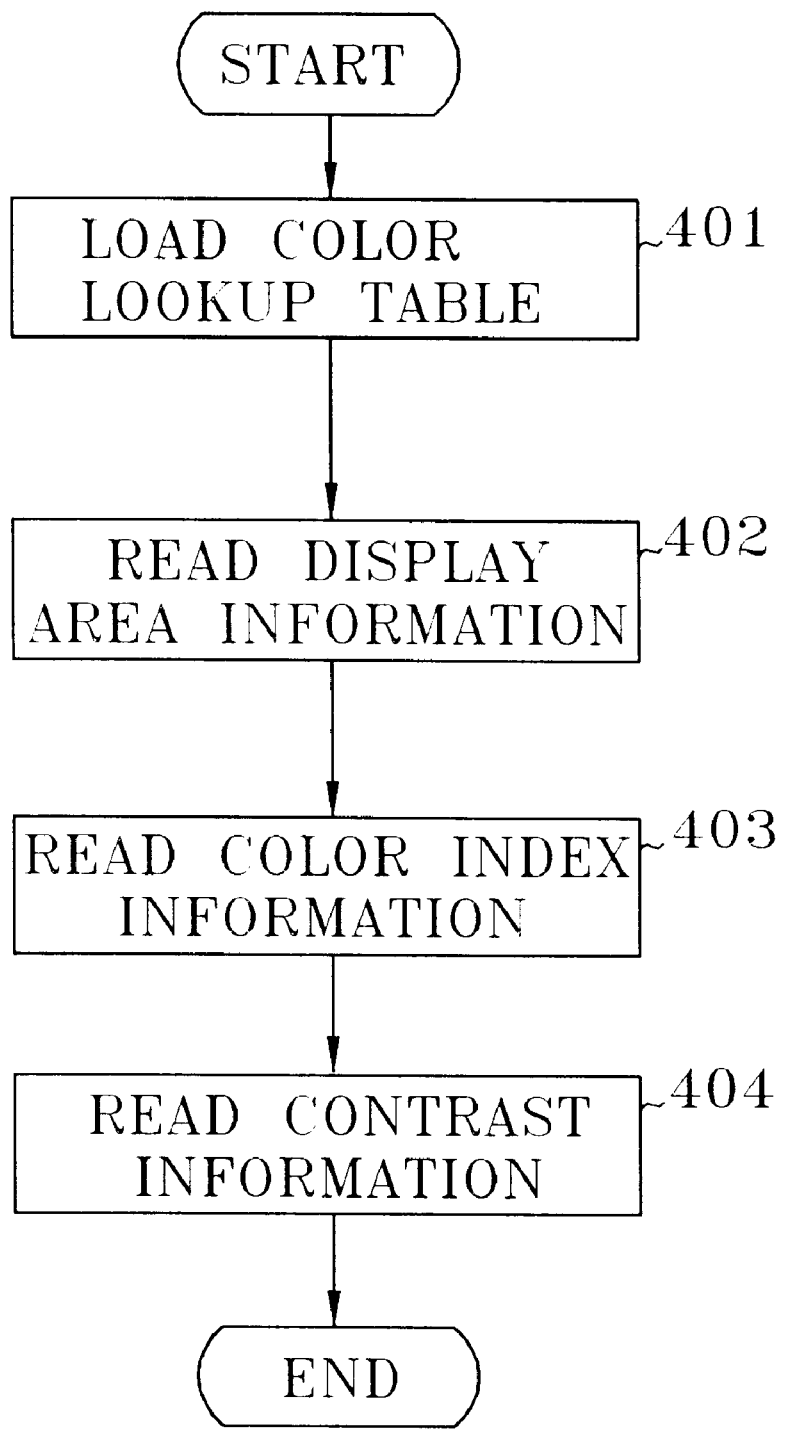
FIG. 4 is a flow-chart diagram for explaining the operation whenever the FIG. 3 apparatus starts processing every frame.

FIG. 4 is a flow-chart diagram for explaining the operation whenever the FIG. 3 apparatus starts to process every frame.

The controller 34 gains access to the color lookup table Color_LUT and the sub-picture data stored in the bit stream buffer 33 via the bit stream buffer controller 32. The controller 34 loads the accessed color lookup table Color_LUT to a color controller 37 in step 401. Then, the controller 34 analyzes commands in the DCSQT defined in the accessed sub-picture data. First, the controller 34 reads information about an area from the DCSQT in which the sub-picture data will be actually displayed on a screen, to thereby obtain the size of the width and length with respect to the display area in step 402. The data obtained in step 402 is used to control execution and stop of a decoding operation of the run-length decoder 35, and to control the output timing of the decoded sub-picture data. The controller 34 reads the color index information Color_Idx in the DCSQT in step 403, and then reads the contrast information Const_Idx in step 404, to output the read data to an index generator 36. The color index information Color_Idx and the contrast information Const_Idx are used to obtain a color value and a contrast value to be displayed with respect to a pixel pattern. The controller 34 performs an operation to be described with reference to FIGS. 5A and 5B every odd or even field after performing the above operation.

Figure 5A:
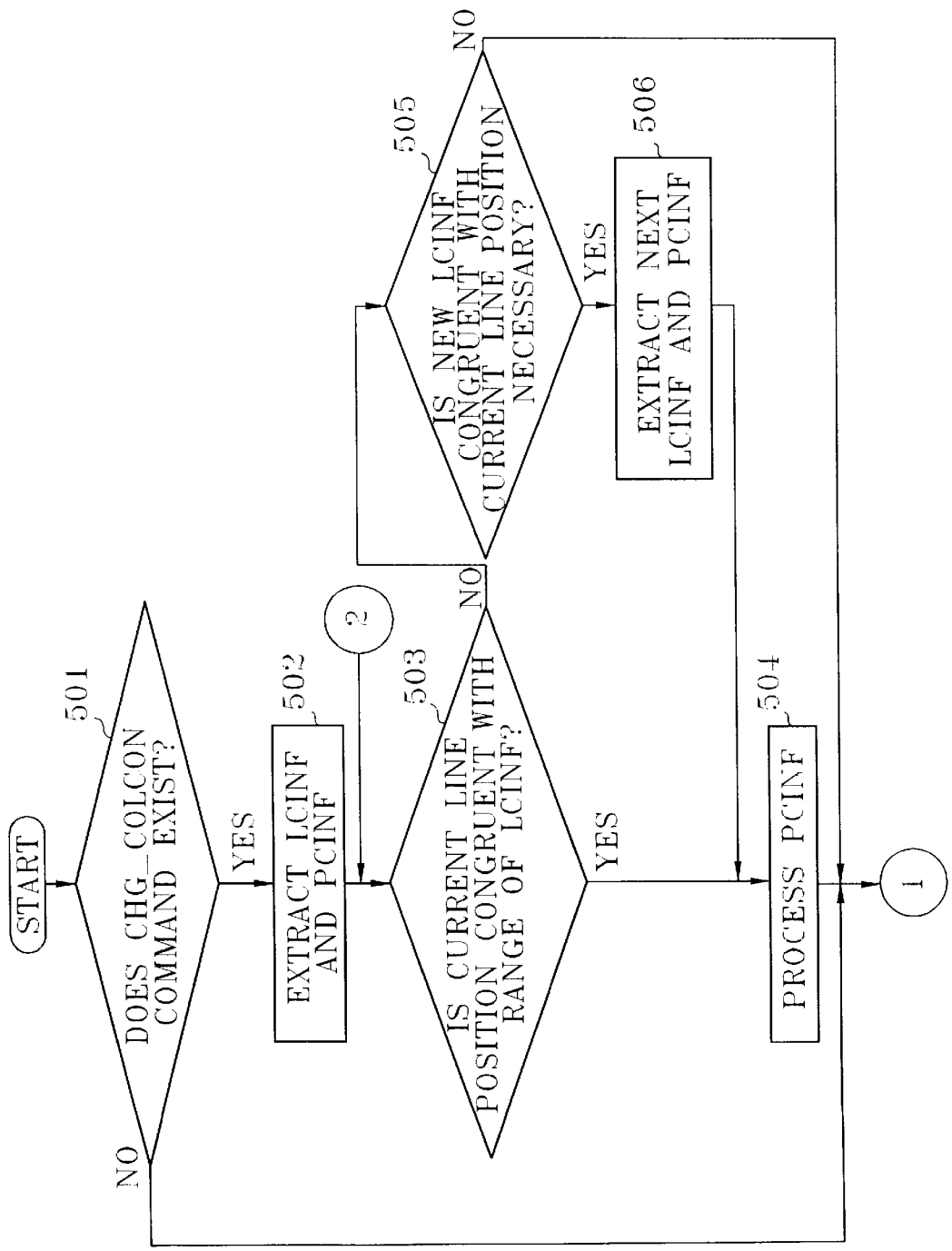

FIGS. 5A and 5B are a flow-chart diagram for explaining the operation of the apparatus of FIG. 3, with respect to every field.

In step 501, the controller 34 checks whether the color of the sub-picture pixel and the command (CHG_COLCON) for altering the contrast exist in the DCSQT. The controller 34 uses the current color index information Color_Idx and the contrast information Const_Idx to decode the sub-picture data if the command (CHG_COLCON) does not exist. To do so, the controller 34 performs the steps following step 507. On the other hand, if the command (CHG_COLCON) exists, this means that the color index information Color Idx and the contrast information Const_Idx applied to the index generator 36 are altered at part of the area.

Figure 1:
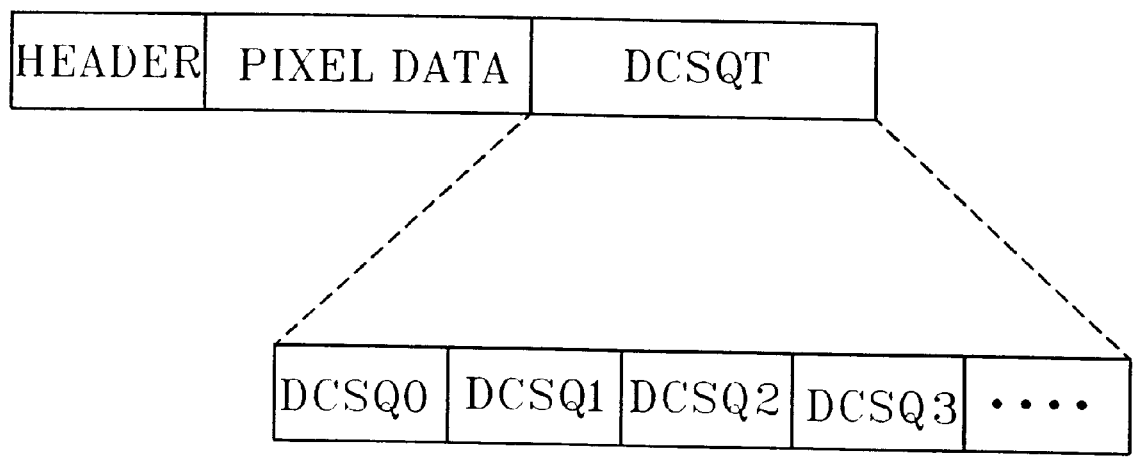
FIG. 1 is a conceptual diagram showing the structure of sub-picture data defined in the DVD standard.
Figure 2:
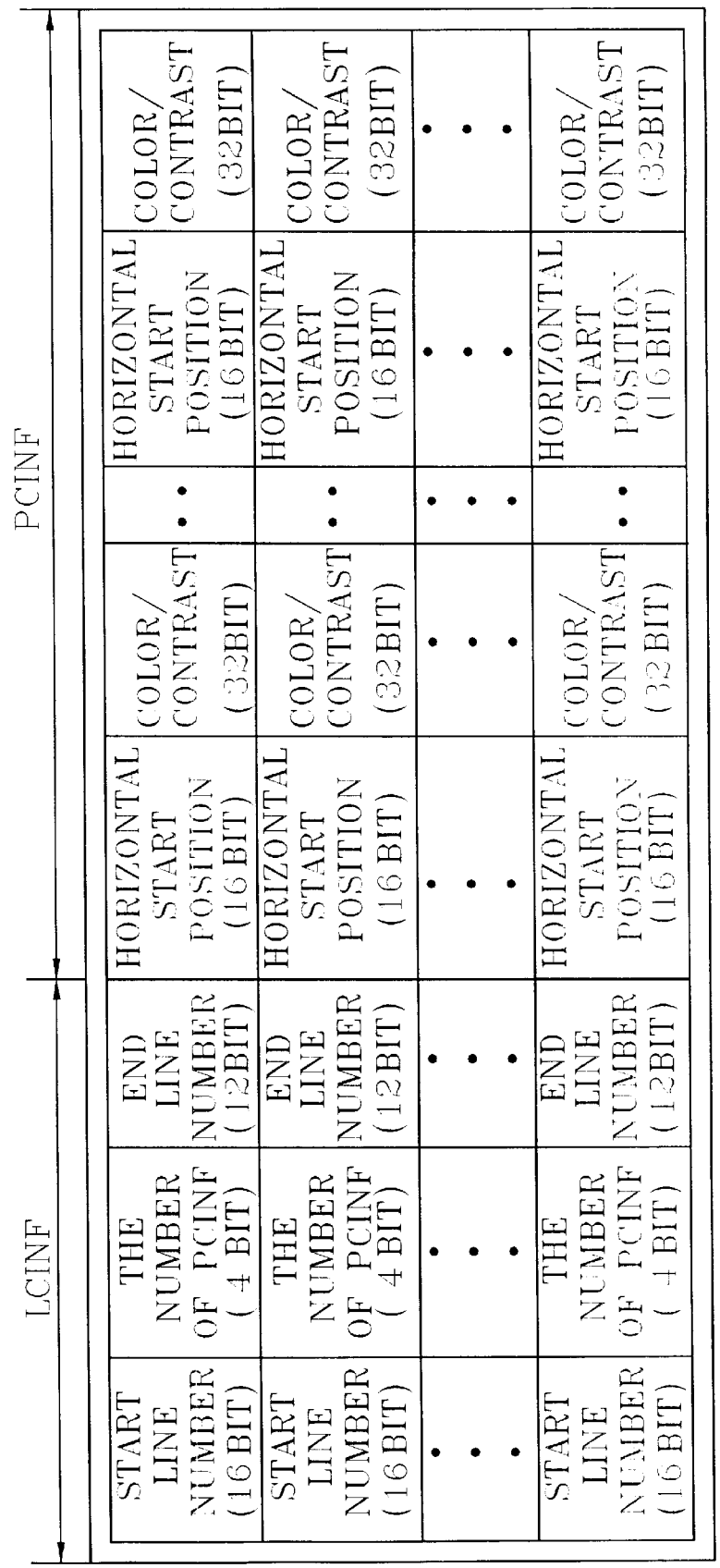
FIG. 2 is a conceptual diagram showing the pattern of a command CHG_COLCON for altering the color and contrast of the sub-picture pixel.

The magnitude of the information is variable according to the amount of the line control information LCINF and the pixel control information PCINF of FIG. 2 which belong to one frame. As a greater amount of the information is altered, the magnitude of the information is enlarged. Thus, the sub-picture data is processed on a minimum unit basis of the pixel control information PCINF, belonging to the line control information LCINF, and the line control information LCINF.

If the command CHG_COLCON exists, the controller 34 extracts the line control information LCINF and the pixel control information PCINF from the command CHG_COLCON on a minimum unit basis in step 502. The controller 34 checks whether the current line position is congruous with a range (between a start line number and an end line number) designated by the extracted line control information LCINF in step 503. The controller 34 judges that the extracted pixel control information PCINF is valid at a current position if the current line position is congruent with the range designated by the line control information LCINF, and supplies the new color index and contrast information contained in the pixel control information PCINF to the index generator 36 in step 504. That is, the controller 34 alters the color index information Color Idx and the contrast information Const_Idx applied to the index generator 36 into the new color index and contrast information.

Meanwhile, the controller 34 checks whether new line control information LCINF congruent with the current line position is necessary in step 505 if the current line position is not congruent with the range designated by the line control information LCINF. The controller 34 judges that the new line control information LCINF is not necessary if the current line position leads to the range designated by the extracted line control information LCINF. In this case, the controller 34 executes the following steps including step 507, and maintains the extracted pixel control information PCINF until the current line position is congruent with the range designated by the line control information LCINF.

Meanwhile, the controller 34 judges that the extracted pixel control information PCINF is not valid any more if the current line position lags behind the range designated by the extracted line control information LCINF. In this case, the controller 34 reads the new line control information LCINF and the pixel control information PCINF which are congruent with the current line in step 506. The controller 34 alters the color and contrast into the new color index and contrast information contained in the newly extracted pixel control information PCINF in step 504. That is, the color and contrast belonging to the area designated by the pixel control information PCINF with respect to each pixel are altered into the corresponding color index and contrast information.

Then, the controller 34 reads the pixel data Pixel_Data in the sub-picture data and outputs the same to the run-length decoder 35 in step 507. The controller 34 controls the run-length decoder 35 and decodes the pixel data read from step 507 in correspondence to the width and length display size and the position to be displayed on a screen which are obtained via the command analysis from the DCSQT (step 508). The controller 34 checks whether the pixel data with respect to the whole line is completely decoded in step 509. The controller 34 executes step 507 if the pixel data is not completely decoded. However, if step 509 determines a line is completely decoded, a determination is then made, in step 510, whether the current line is an end of one field. In step 511, the controller 34 checks whether a command CHG_COLCON for altering the color and contrast of the sub-picture pixel exists if the current line is not the end thereof. The controller 34 executes step 503 if the command CHG_COLCON exists and step 507 if not.

Referring again to FIG. 3, the run-length decoder 35 receives the pixel data Pixel_Data which has been compressed and encoded in the run-length manner via the controller 34, and run-length-decodes the received pixel data. The run-length decoder 35 outputs the 2-bit data representing the pixel type as the decoded data. To control the run-length decoder 35, the controller 34 stops the decoding operation of the run-length decoder 35 if the current pixel position is an area where the sub-picture is not displayed, and continues the decoding operation thereof if the pixel postion reaches the display area. The index generator 36 receives the color index information Color_Idx and the contrast information Const_Idx which are calculated by the controller 34 via the execution of the operation shown in FIGS. 5A and 5B, and the pixel type data output from the run-length decoder 35. The index generator 36 outputs the color index and contrast value corresponding to the received pixel type data among the received color index information Color_Idx and the contrast information Const_Idx. The color index is input to a color controller 37. The color controller 37 selects a color value of a position designated by the color index on a color lookup table Color_LUT loaded via the controller 34 and outputs the selected result. A corresponding pixel in the sub-picture display area on the screen is represented by the color value and the contrast value. As a result, the sub-picture is displayed at a predetermined position on the screen.

As described above, the present invention restores the sub-picture data which has been compressed and encoded according to the DVD standard and enables display of the sub-picture such as characters or graphics on a desired area on the screen.

While only certain embodiments of the invention have been specifically described herein, it will apparent that numerous modifications may be made thereto without departing from the spirit and scope of the invention.

What is claimed is:

1. A sub-picture restoring method in a digital video disk system, the sub-picture restoring method comprising the steps of:

(a) storing input sub-picture data and color lookup table;
(b) analyzing a display control sequence table contained in the sub-picture data of step (a);
(c) decoding pixel data in the sub-picture data stored in step (a), based on an analysis result obtained in step (b);
(d) determining a contrast value corresponding to an individual pixel which is expressed by the pixel data decoded in step (c), based on the analysis result obtained in step (b); and
(e) determining a color value corresponding to the individual pixel of step (d) in the color lookup table of step (a), using a color index obtained by the analysis result obtained in step (b).

2. The sub-picture restoring method according to claim 1, wherein said analyzing step (b) analyzes each command of the display control sequence table to obtain a sub-picture display area on a screen, and color index information and contrast information for representing pixels in the sub-picture display area.

3. The sub-picture restoring method according to claim 1, wherein said analyzing step (b) is executed at the start of each frame.

4. The sub-picture restoring method according to claim 2, wherein said analyzing step (b) comprising the sub-steps of:

(b1) checking whether a command for altering the color and contrast of pixels exists in the display control sequence table;
(b2) if the command is determined in step (b1) to exist, reading the corresponding line control information and pixel control information from the display control sequence table on the minimum unit basis and comparing the current line position with a range defined in the line control information;
(b3) if the current line position is congruent with the range defined in the line control information, altering the color index information and the contrast information according to the pixel control information;
(b4) if the current line position is not congruent with the range defined in the line control information and if new line control information is necessary, reading the line control information and the pixel control information and altering the color index information and the contrast information according to the pixel control information; and
(b5) if the current line position is not congruent with the definition range of the line control information and if new line control information is not necessary, maintaining the color index information and the contrast information.

5. The sub-picture restoring method according to claim 4, wherein said analyzing step (b) is executed in units of a line for every field.

6. The sub-picture restoring method according to claim 2, wherein said step (c) decodes the pixel data and outputs data in the form of a predetermined number of bits representing a plurality of pixel types, within the display area on a screen obtained by said analysis in step (b).

7. The sub-picture restoring method according to claim 6, wherein said step (d) outputs a contrast value corresponding to the pixel type data from the contrast information obtained by said step (b) analysis.

8. The sub-picture restoring method according to claim 6, wherein said step (e) extracts a color index for color designation corresponding to the pixel type data from the color index information obtained by said step (b) analysis, and outputs a color value, corresponding to a pixel, which is designated by the color index in the color lookup table.

9. A sub-picture restoring apparatus in a digital video disk system, the sub-picture restoring apparatus comprising:

storage means for storing input sub-picture data and a color lookup table;

control means for analyzing a display control sequence table contained in the sub-picture data stored in the storage means and obtaining a sub-picture display area on a screen, and color index information and contrast information for displaying a pixel in the sub-picture display area;

decoding means for decoding pixel data in the sub-picture data stored in the storage means; and determining means for determining a contrast value corresponding to an individual pixel which is expressed by the pixel data decoded in the decoding means using the contrast information obtained by the control means and determining a color value for a corresponding pixel in the color lookup table stored in the storage means using a color index information obtained by the control means.

10. The sub-picture restoring apparatus according to claim 9, wherein said storing means comprises a bit stream buffer for storing the sub-picture data and the color lookup table of a compression-encoded bit stream.

11. The sub-picture restoring apparatus according to claim 9, wherein said control means analyzes various commands of the display control sequence table whenever every frame starts.

12. The sub-picture restoring apparatus according to claim 9, wherein said control means controls said decoding means to decode the pixel data in a match for the sub-picture display area on the screen.

13. The sub-picture restoring apparatus according to claim 9, wherein said control means extracts line control information and pixel control information from a command, on a minimum unit basis, if a command for altering the color and contrast of the pixel exists in the display control sequence table of the sub-picture data for a field, and alters the current color index information and the contrast information according to the extracted pixel control information whenever a current line position belongs to a range defined in the extracted line control information.

14. The sub-picture restoring apparatus according to claim 13, wherein said control means maintains current color index information and contrast information if the current line position does not belong to the range defined in the extracted line control information.

15. The sub-picture restoring apparatus according to claim 13, wherein said control means operates on a minimum unit basis of the line control information and the pixel control information corresponding to the line control information.

16. The sub-picture restoring apparatus according to claim 15, wherein said control means checks whether a command for altering the color and contrast of a pixel exists whenever pixel data with respect to a particular line is decoded in said decoding means.

17. The sub-picture restoring apparatus according to claim 9, wherein said decoding means comprises a run-length decoder for decoding the input pixel data in a run-length manner and outputting data wherein a predetermined number of bits represents a plurality of pixel types.

18. The sub-picture restoring apparatus according to claim 17, wherein said determining means comprises:

an index generator for outputting a color index for color designation corresponding to the pixel type data and a contrast value corresponding to the pixel type data from the color index information and the contrast information obtained by said control means; and a color controller for outputting the color value positioned at a position designated by the color index of said index generator from the color lookup table.

* * * * *